United States Patent

Gwyn

[11] Patent Number: 5,092,205
[45] Date of Patent: Mar. 3, 1992

[54] HAND LATHE APPARATUS

[76] Inventor: Bernard L. Gwyn, 252 Benns Rd., Newport News, Va. 23601

[21] Appl. No.: 529,536

[22] Filed: May 29, 1990

[51] Int. Cl.$^5$ .................................................. B23B 3/22
[52] U.S. Cl. ............................................ 82/128; 30/96; 279/36; 408/106
[58] Field of Search ............... 82/113, 128; 30/93, 30/94, 95, 96; 279/36, 107, 123; 408/105, 106, 146, 202, 104; 10/107 PH, 101 P, 89 P

[56] References Cited

U.S. PATENT DOCUMENTS

| | | | |
|---|---|---|---|
| 813,530 | 2/1906 | Spear | 408/106 |
| 860,130 | 7/1907 | Forsberg | 30/96 |
| 991,668 | 5/1911 | Taylor | 82/128 |
| 1,131,990 | 3/1915 | Bocorselski | 279/36 |
| 2,811,903 | 11/1957 | Harmes | 82/128 |
| 4,355,553 | 10/1982 | Church et al. | 29/27 B |
| 4,359,917 | 11/1982 | Wilger et al. | 82/128 |
| 4,656,898 | 4/1987 | Hunt et al. | 82/113 |
| 4,744,123 | 5/1988 | Le Testu et al. | 82/128 |

*Primary Examiner*—Larry I. Schwartz
*Assistant Examiner*—Kevin J. Carroll
*Attorney, Agent, or Firm*—Leon Gilden

[57] ABSTRACT

An apparatus including a cylindrical body defined by forward and rear threaded end portions to receive a respective forward and rear collar. The forward collar is cooperative with pivotally mounted wedge plates that cooperate with the forward collar to direct associated presser feet into engagement with an associated workpiece to coaxially clamp the workpiece internally of the cylindrical body. The rear collar includes an internally threaded component for cooperation with the rear threads and a radially aligned cutter blade that is directed overlying the workpiece to effect cutting of the workpiece during rotation of the rear collar relative to the workpiece while clamped within the cylindrical body.

6 Claims, 5 Drawing Sheets

FIG. 1
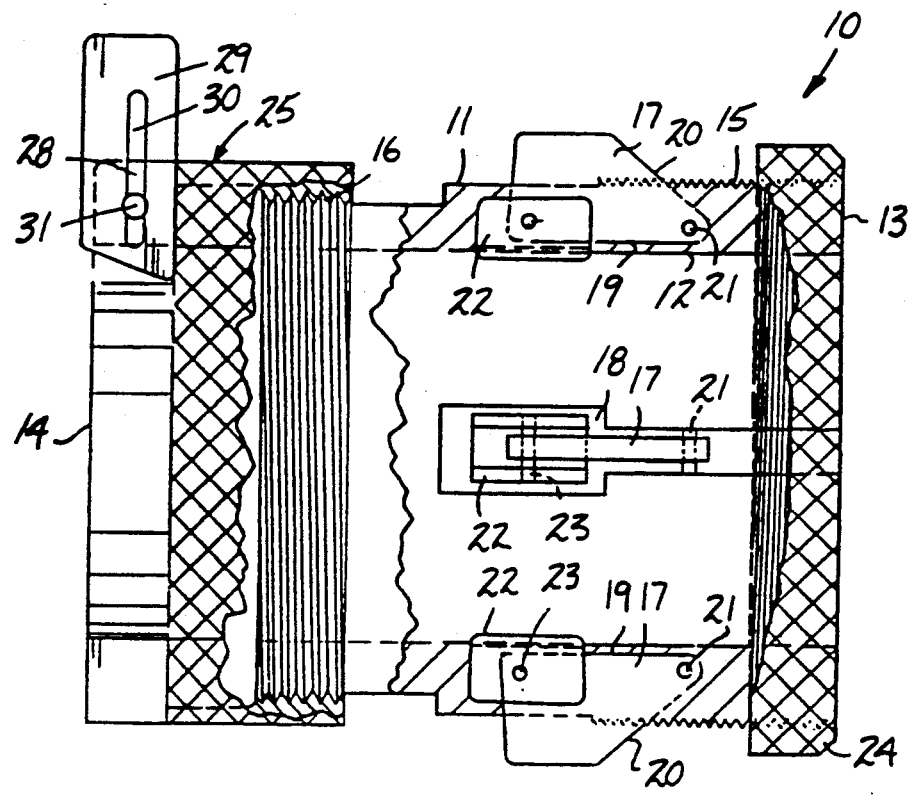
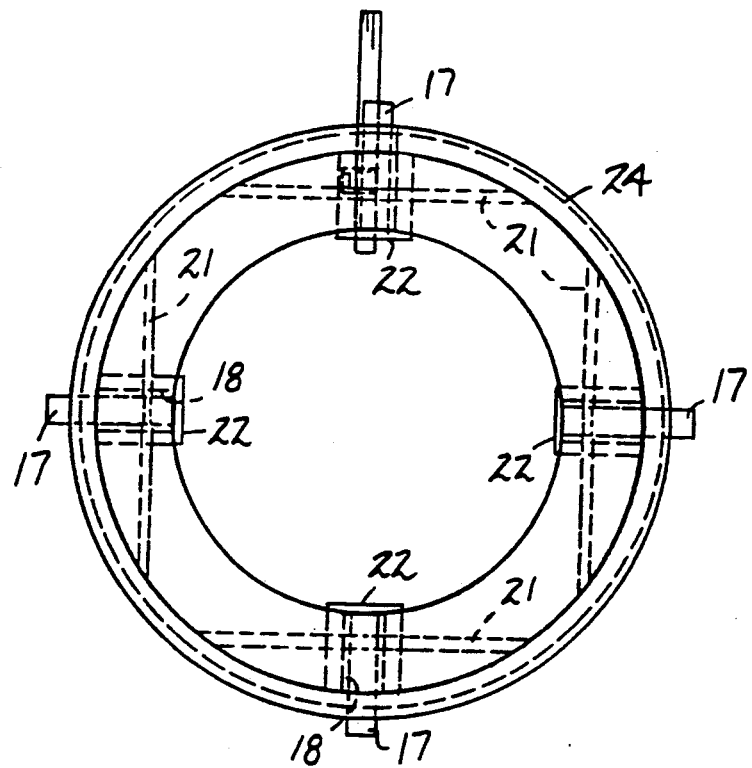
FIG. 2

HAND LATHE APPARATUS

BACKGROUND OF THE INVENTION

1. Field of the Invention

The field of invention relates to lathe apparatus, and more particularly pertains to a new and improved hand lathe apparatus wherein the same permits internal securement of an elongate workpiece, while a manually directed cutter is directed circumferentially about the workpiece to effect a cutting and profiling of the workpiece as desired.

2. Description of the Prior Art

Portable machine type tools adaptably mounted onto an associated workpiece, rather than requiring the workpiece to be transported to a stationary tool, is desirable to effect a portable manipulation of a tool relative to an associated workpiece. Prior art devices are available, but are typically of a rather complex or specialized structure to effect a limited machining operation relative to a particular workpiece. For example, U.S. Pat. No. 4,656,898 to Hunt, et al. sets forth a portable lathe device employed for flange facing and line boring and the like relative to a workpiece adaptably mounted concentrically of the apparatus.

U.S. Pat. No. 4,355,553 to Church, et al. sets forth a portable turning tool for removal of the material from a worn component of a device, such as a motor generator.

U.S. Pat. No. 2,811,903 to Harmes sets forth a facing tool, wherein a workpiece is directed and mounted within a forward end of the tool, with a crank turn to effect a facing operation relative to the workpiece.

U.S. Pat. No. 4,744,123 to Le Testu, et al. sets forth a device for shaving material from outer surfaces of a pipe, wherein the pipe is clamped within a chuck that is directed interiorly of the workpiece.

U.S. Pat. No. 4,359,917 to Wilger, et al. sets forth a portable turning apparatus to permit mounting on a workpiece for in-place cutting, wherein a plurality of radially aligned clamping pins are directed into the workpiece from a forward and rear flange of the apparatus.

As such, it may be appreciated that there continues to be a need for a new and improved hand lathe apparatus wherein the same addresses both the problems of ease of use, as well as effectiveness in construction and in this respect, the present invention substantially fulfills this need.

SUMMARY OF THE INVENTION

In view of the foregoing disadvantages inherent in the known types of turning apparatus now present in the prior art, the present invention provides a hand lathe apparatus wherein the same accommodates a workpiece interiorly of the organization with a ring clamping organization to effect simultaneous clamping of various radially directed shoe members medially of the body of the apparatus to align the workpiece relative to a cutter ring mounted for rotation about the workpiece. As such, the general purpose of the present invention, which will be described subsequently in greater detail, is to provide a new and improved hand lathe apparatus which has all the advantages of the prior art portable lathe apparatus and none of the disadvantages.

To attain this, the present invention provides an apparatus including a cylindrical body defined by forward and rear threaded end portions to receive a respective forward and rear collar. The forward collar is cooperative with pivotally mounted wedge plates that cooperate with the forward collar to direct associated presser feet into engagement with an associated workpiece to coaxially clamp the workpiece internally of the cylindrical body. The rear collar includes an internally threaded component for cooperation with the rear threads and a radially aligned cutter blade that is directed overlying the workpiece to effect cutting of the workpiece during rotation of the rear collar relative to the workpiece while clamped within the cylindrical body.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hand lathe apparatus which has all the advantages of the prior art portable lathe apparatus and none of the disadvantages.

It is another object of the present invention to provide a new and improved hand lathe apparatus which may be easily and efficiently manufactured and marketed.

It is a further object of the present invention to provide a new and improved hand lathe apparatus which is of a durable and reliable construction.

An even further object of the present invention is to provide a new and improved hand lathe apparatus which is susceptible of a low cost of manufacture with regard to both materials and labor, and which accordingly is then susceptible of low prices of sale to the consuming public, thereby making such hand lathe apparatus economically available to the buying public.

Still yet another object of the present invention is to provide a new and improved hand lathe apparatus which provides in the apparatuses and methods of the prior art some of the advantages thereof, while simultaneously overcoming some of the disadvantages normally associated therewith.

Still another object of the present invention is to provide a new and improved hand lathe apparatus wherein the same simultaneously effects clamping by a plurality of clamping elements of a workpiece positioned concentrically and longitudinally of the body of the apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view, partially in section, of the instant invention.

FIG. 2 is an orthographic end view of the instant invention.

DESCRIPTION OF THE PREFERRED EMBODIMENT

Figure 4:
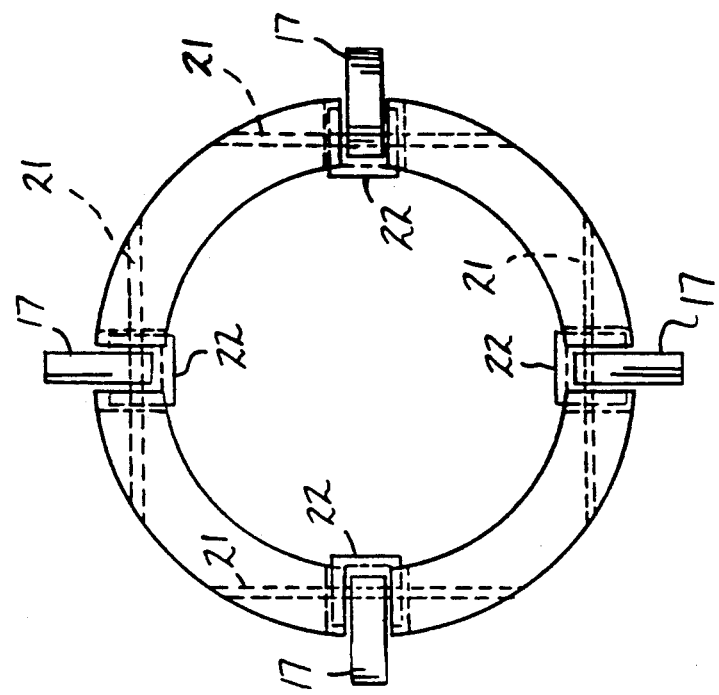
FIG. 4 is an orthographic end view of the instant invention, as set forth in FIG. 3.
Figure 3:
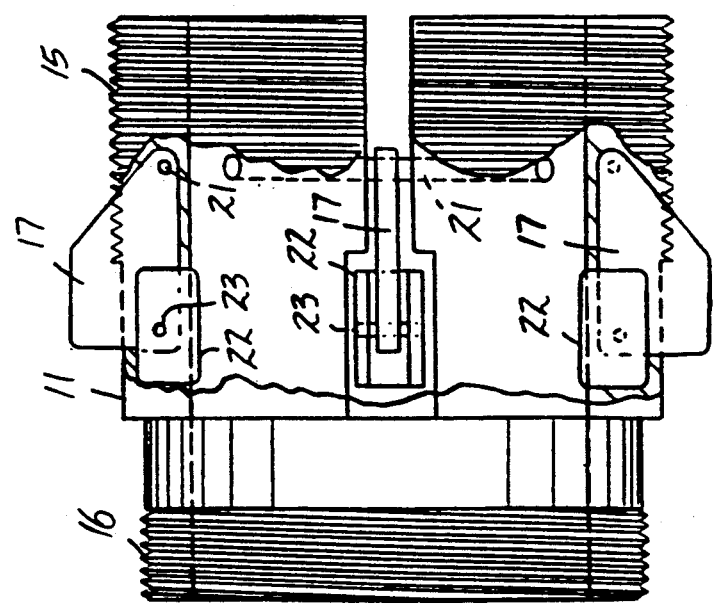
FIG. 3 is an orthographic side view, partially in section, illustrating the various components of the clamping presser feet of the instant invention.
Figure 5:
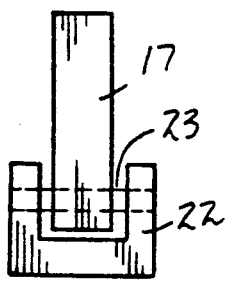
FIG. 5 is an orthographic end view of the presser foot and wedge plate organization of the instant invention.
Figure 6:
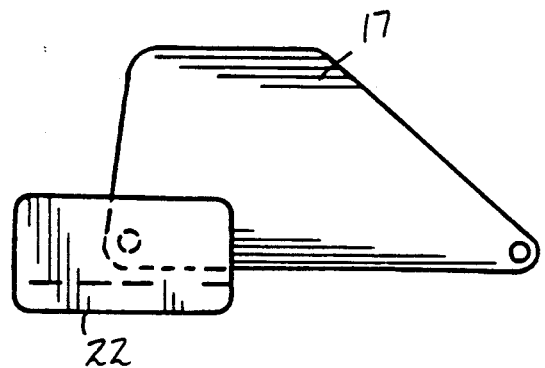
FIG. 6 is an orthographic side view, taken in elevation, of the presser foot and wedge plate organization of the instant invention.
Figure 7:
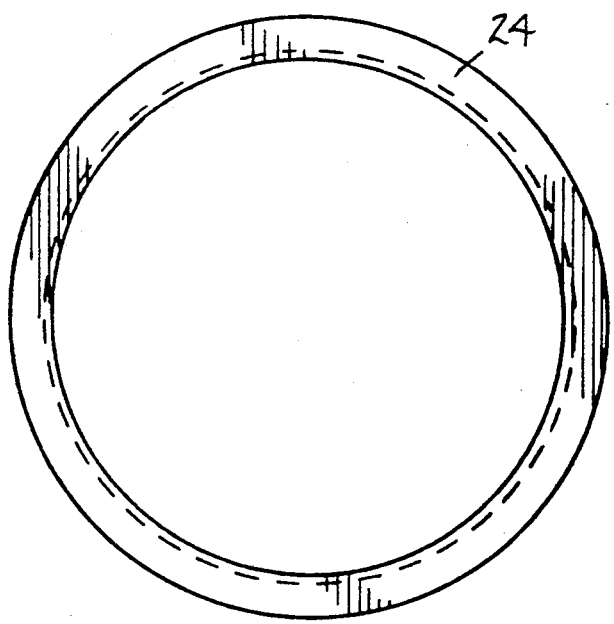
FIG. 7 is an orthographic end view of the forward collar of the instant invention.
Figure 8:
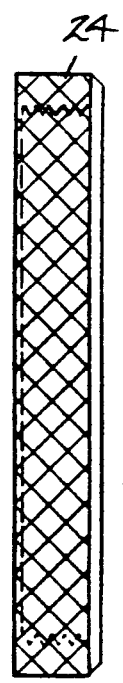
FIG. 8 is an orthographic side view, taken in elevation, of the forward collar of the instant invention.
Figure 9:
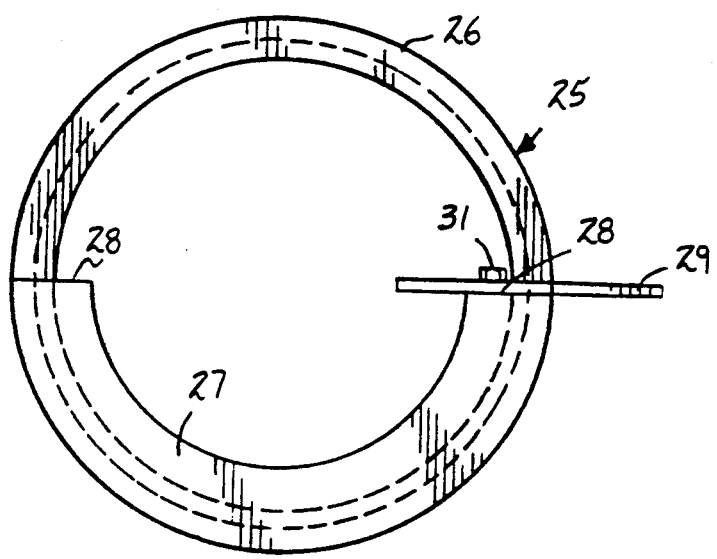
FIG. 9 is an orthographic end view of the rear collar of the instant invention.
Figure 10:
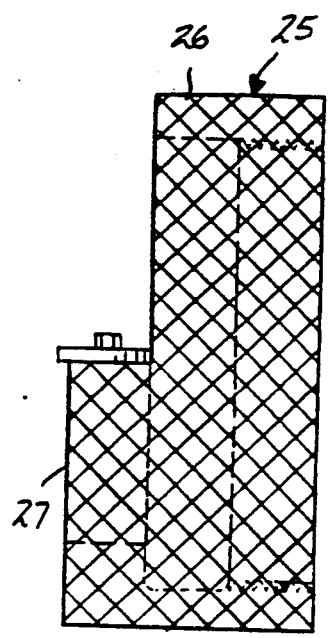
FIG. 10 is an orthographic side view, taken in elevation, of the rear collar of the instant invention.

With reference now to the drawings, and in particular to FIGS. 1 to 15 thereof, a new and improved hand lathe apparatus embodying the principles and concepts of the present invention and generally designated by the reference numeral 10 will be described.

Figure 13:
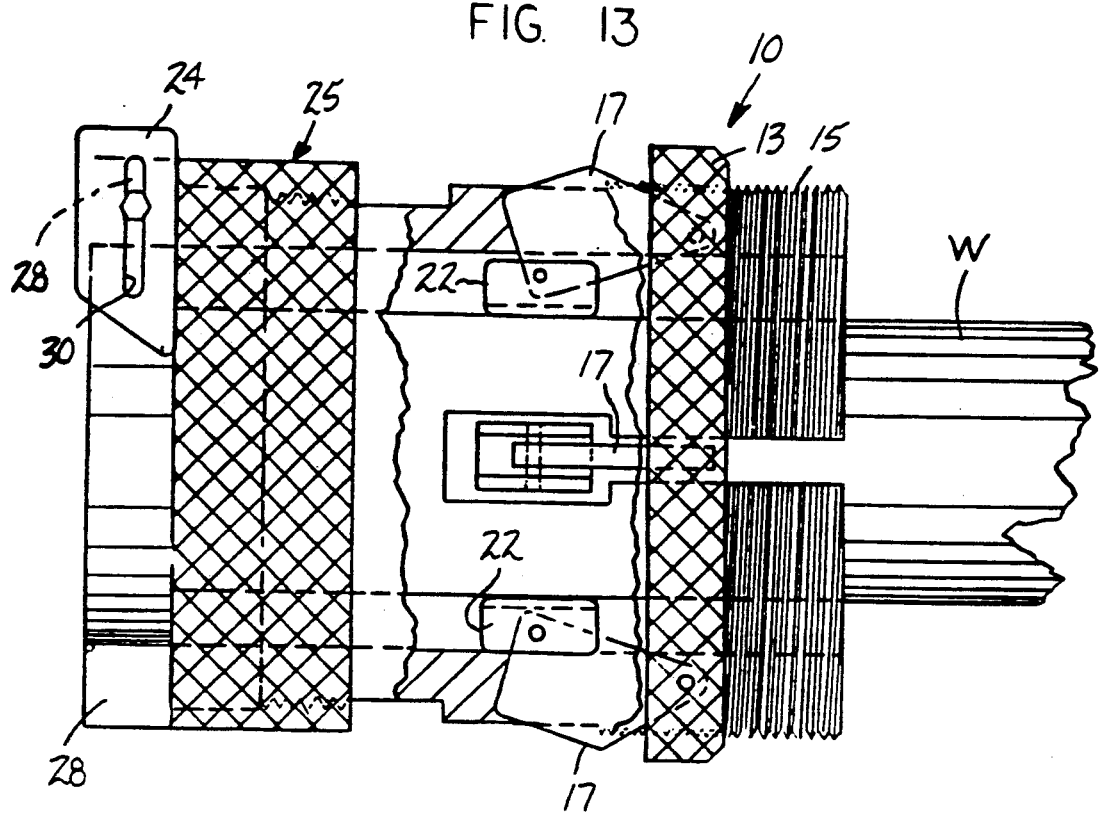
FIG. 13 is an orthographic side view, taken in elevation, of the instant invention with a workpiece positioned concentrically thereof.

More specifically, the hand lathe apparatus 10 of the instant invention essentially includes an elongate longitudinally aligned cylindrical body 11, including a coaxially aligned cylindrical interior surface 12. The cylindrical body 11 includes a forward end 13 and a rear end 14, with the forward end including a forward external threaded surface 15, and the rear end including a rear external threaded surface 16, wherein each threaded surface is formed about the cylindrical body 11 extending to the respective forward and rear ends 13 and 14. A series of wedge plates 17 are mounted through the cylindrical body 11 within "T" shaped slots 18. Each wedge plate 17 is positioned at an equal spacing rearwardly of the forward end 13 and arranged and positioned ninety degrees relative to one another through the cylindrical body 11 within a respective "T" shaped slot 18. Each wedge plate 17 includes a bottom edge 19 and a forward edge 20, wherein the forward edge 20 is arranged at an acute angle relative to the bottom edge 19. A forward axle 21 is directed orthogonally through each wedge plate 17 adjacent an intersection defined by the bottom edge 19 and the forward edge 20, with a "U" shaped presser foot 22 pivotally mounted to the bottom edge 19 remote from the forward edge 20. Each "U" shaped presser foot 22 includes an axle 23 to pivotally mount each "U" shaped presser foot to each respective wedge plate 17, with the forward axle 21 and the pressure foot axle 23 arranged parallel relative to one another. An internally threaded forward lock collar 24 includes a knurled and roughened exterior surface and is threaded mounted on the forward external threads 15. Rotation of the forward collar 24 about the forward threads 15 effects directing of the forward collar overlying and in contact with the forward edge 20 of each wedge plate 17 to effect pivotment of each wedge plate 17 downwardly, in a manner as illustrated in FIG. 13 for example, to effect interengagement and locking of a workpiece "W" coaxially within the cylindrical body 11 interiorly of the interior surface 12. The forward axle 21 is, as illustrated, fixedly mounted to the cylindrical body 11 orthogonally oriented relative to an axis defined by the cylindrical body to effect downward pivotment of a rear edge of each wedge plate to effect contact of each "U" shaped presser foot 22 with the associated exterior surface of a workpiece "W", as illustrated in FIG. 13.

An internally threaded rear support collar 25 is mounted to the rear thread 16, and includes an annular ring member 26 and a semi-annular ring member 27 coaxially and fixedly mounted relative to one another, wherein the semi-annular ring member 27 defines diametrically aligned surfaces 28 that are arranged in a single plane, with at least a single cutter 29 mounted to one of the plurality of the surfaces 28, in a manner as illustrated in FIG. 1 for example. The cutter 29 includes a slot 30 to effect radial depth penetration of a forward cutting edge of each cutter 29 with the associated workpiece "W", with a cutter fastener 31 locking the cutter 29 in an adjustable relationship relative to its associated surface 28. It is understood that a further cutter 29 can be mounted on the opposing diametrically aligned surface 28, in a manner as illustrated in FIG. 1, that secures the cutter 29 to its associated surface 28.

Figure 11:
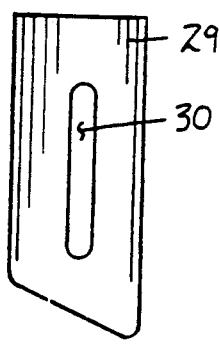
FIG. 11 is an orthographic side view, taken in elevation, of a cutter blade utilized by the instant invention.
Figure 12:
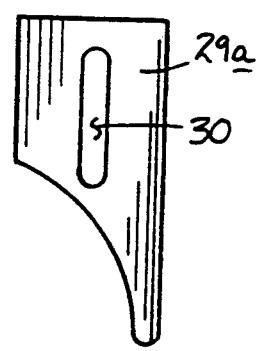
FIG. 12 is an orthographic side view, taken in elevation, of a further cutter blade utilized by the instant invention.
Figure 14:
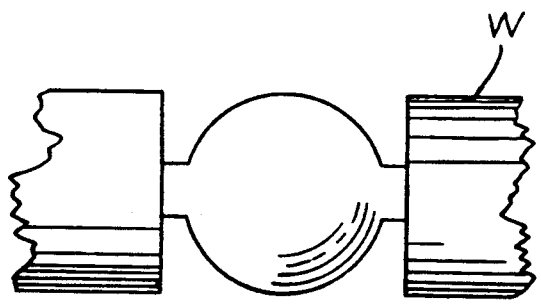
FIG. 14 is an orthographic side view, taken in elevation, of a profiled workpiece effected by the instant invention.
Figure 15:
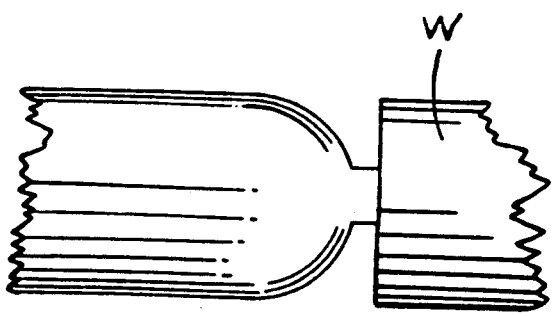
FIG. 15 is an orthographic side view of a further workpiece profiled by the instant invention.

It is understood therefore that upon locking of the workpiece "W", in a manner as illustrated in FIG. 13, the rear collar 25 may be rotated about the rear threads 16 and upon proper adjustment radially of the cutter 29, effect profiling of an associated workpiece, in a manner as illustrated in FIGS. 14 and 15 for example. Further, various cutters may be utilized, such as that as illustrated in FIG. 12, wherein the modified cutter 29 defines a hollow ground trailing edge to accommodate a profile of the workpiece "W", in a manner differing from that of the cutter 29, as illustrated in FIG. 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand lathe apparatus comprising,
    an elongate longitudinally aligned cylindrical body, the cylindrical body including a through-extending bore defined by a coaxially aligned interior cylindrical surface, and
    the cylindrical body including a forward end and a rear end, the forward end and the rear end each including a respective forward thread and rear thread each respectively formed in surrounding relationship relative to the cylindrical body, and
    a forward collar mounted about the forward threads, and
    a rear collar mounted about the rear threads, and
    clamping means mounted through the cylindrical body for selective clamping of a workpiece directed through the cylindrical body, wherein the forward collar is cooperative with the clamping means to effect clamping of the workpiece, and
    wherein the rear collar is threadedly mounted about the rear threads to effect profiling of the workpiece mounted within the cylindrical body, and
    wherein the clamping means includes a series of wedge plates, the wedge plates each positioned at an equal spacing relative to the forward end of the cylindrical body, and each received within a "T" shaped slot directed through the cylindrical body, and each wedge plate including a "U" shaped presser foot pivotally mounted adjacent a rear end of each wedge plate, and each wedge plate including a forward axle, the forward axle orthogonally aligned relative to an axis defined by the cylindrical body and mounted within the cylindrical body.

2. An apparatus as set forth in claim 1 wherein the wedge plate includes a bottom edge and a forward edge, the forward edge arranged at an acute angle relative to the bottom edge, and the forward collar cooperative with the forward edge to effect pivotment of the wedge plate about the forward axle of each wedge plate to direct each associated presser foot against the workpiece.

3. An apparatus as set forth in claim 2 wherein each "U" shaped presser foot receives the bottom edge of the wedge plate therewithin, and includes a rear axle to pivotally mount each presser foot to each wedge plate, and wherein each rear axle is arranged parallel to each forward axle, and each wedge plate is arranged about the cylindrical body at ninety degree intervals.

4. An apparatus as set forth in claim 3 wherein the rear collar includes an annular ring, including an internally threaded interior surface cooperative with the rear threads, and a semi-annular ring fixedly and integrally mounted to the annular ring, wherein the semi-annular ring includes diametrically aligned planar surfaces arranged in a single plane, wherein at least one of said surfaces includes a cutter mounted thereon.

5. An apparatus as set forth in claim 4 wherein the cutter includes an elongate slot, and the cutter includes a cutter fastener directed through the slot into the at least one of said planar surfaces.

6. An apparatus as set forth in claim 5 wherein the cutter is arranged radially relative to the cylindrical body and the rear collar.

* * * * *